(12) United States Patent
Wang (10) Patent No.: US 10,890,798 B2
(45) Date of Patent: Jan. 12, 2021

(54) LIQUID CRYSTAL DISPLAY PANEL AND MANUFACTURING METHOD THEREOF

(71) Applicant: WUHAN CHINA STAR OPTOELECTRONICS TECHNOLOGY CO., LTD., Hubei (CN)

(72) Inventor: Wei Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/477,673

(22) PCT Filed: Dec. 25, 2018

(86) PCT No.: PCT/CN2018/123367
§ 371 (c)(1),
(2) Date: Jul. 12, 2019

(87) PCT Pub. No.: WO2019/128959
PCT Pub. Date: Jul. 4, 2019

(65) Prior Publication Data
US 2019/0361291 A1 Nov. 28, 2019

(30) Foreign Application Priority Data
Dec. 27, 2017 (CN) .......................... 2017 1 1444635

(51) Int. Cl.
*G02F 1/1335* (2006.01)
*G02F 1/1362* (2006.01)

(52) U.S. Cl.
CPC .. *G02F 1/133516* (2013.01); *G02F 1/133512* (2013.01); *G02F 1/133514* (2013.01); *G02F 1/136209* (2013.01)

(58) Field of Classification Search
CPC ......... G02F 1/133512; G02F 1/133514; G02F 1/133516
See application file for complete search history.

(56) References Cited

U.S. PATENT DOCUMENTS

2008/0068541 A1    3/2008  Sun et al.
2013/0278858 A1*  10/2013  Hashimoto ....... G02F 1/133512
                                                                     349/58
(Continued)

FOREIGN PATENT DOCUMENTS

CN    1556421 A    12/2004
CN  104865741 A     8/2015
(Continued)

*Primary Examiner* — Jessica M Merlin (57) ABSTRACT

The present disclosure provides a liquid crystal display panel and a manufacturing method thereof. The display panel includes a color filter substrate. The color filter substrate includes a color resist layer. The color resist layer includes a first color resist area and a second color resist area. The first color resist area corresponds to a display area. The second color resist area corresponds to a non-displaying area. The second color resist area includes a first color resist and a second color resist, and the second color resist is formed in the first color resist.

12 Claims, 5 Drawing Sheets

(56) References Cited

U.S. PATENT DOCUMENTS

2015/0362795 A1* 12/2015 Chen ................. G02F 1/133512
                                                           349/42
2016/0011347 A1*  1/2016 Tseng ..................... G02B 5/201
                                                           349/106
2018/0004036 A1*  1/2018 Hwang ............. G02F 1/133512

FOREIGN PATENT DOCUMENTS

| CN | 206431397 U   | 8/2017 |
| KR | 20130015737 A | 2/2013 |

* cited by examiner

LIQUID CRYSTAL DISPLAY PANEL AND MANUFACTURING METHOD THEREOF

FIELD OF INVENTION

The present disclosure relates to the field of manufacturing display panel, in particular to a liquid crystal display panel and manufacturing of the liquid crystal display panel.

BACKGROUND OF INVENTION

Liquid crystal displays (LCDs) are most widely adopted display devices in market. LCDs are highly accepted by market due to their mature manufacture technologies, high yield, and low manufacturing costs.

LCDs consist of a color filter (CF) substrate, an array substrate, and liquid crystals disposed between the CF substrate and the array substrate. The CF substrate forms a black matrix (BM) through color resist units, including red (R) color, green (G) color, and blue color (B). BM has color filtering layer to prevent light leakage at the edge of pixels.

Figure 1:
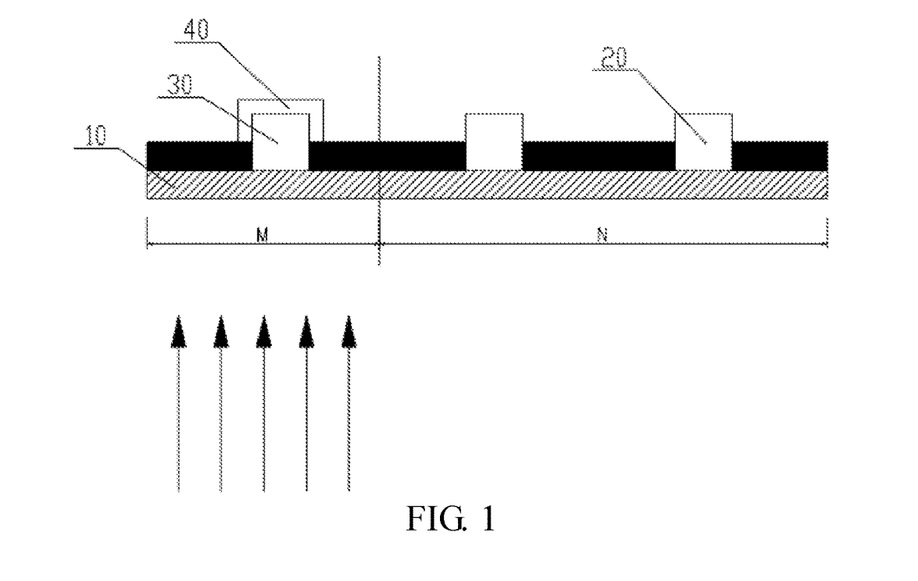
FIG. 1 illustrates a file layer structure of a color filter substrate of the present technology.

FIG. 1 illustrates a film layer structure of concaves of peripheral BM in the present technology. After an incident light passes through the first substrate 10, it enters the liquid crystal display through a red color resist block 30 and a blue color resist block 40 sequentially. FIG. 1 shows emitting light is red due to the thickness difference between the red color resist block and the blue color resist block. Therefore, the red light leakage problems happening on concaves of the peripheral BM make the LCD display abnormally.

SUMMARY OF INVENTION

The present disclosure provides a liquid crystal display panel and a manufacturing method of the liquid crystal display panel to solve problems of red light leakage happening on concaves of the peripheral black matrix.

To solve the above-mentioned problems, the present disclosure provides following technical solutions.

The present disclosure provides a liquid crystal display panel includes displaying area and non-displaying area. The non-displaying area surrounds the displaying area.

The display panel includes: an array substrate; a color filter substrate disposed opposite to the array substrate. The color filter substrate including: a first substrate; a first black matrix disposed on the first substrate; a color resist layer disposed on the first substrate. The color resist layer including: a first color resist area corresponding to the display area; a second color resist area corresponding to the non-display area. The second color resist area includes a first color resist and a second color resist, and the second color resist is disposed on the first color resist.

In the liquid crystal display panel of the present disclosure, the first color resist is one of a red color resist block, a green color resist block, and a blue color resist block. The second color resist is another one of the red color resist block, the green color resist block, and the blue color resist block, and the second color resist is different from the first color resist.

In the liquid crystal display panel of the present disclosure, a thickness of the first color resist is equal to a thickness of the second color resist.

In the liquid crystal display panel of the present disclosure, thicknesses of the first color resist and the second color resist are less than a thickness of the color resist layer in the first color resist area.

In the liquid crystal display panel of the present disclosure, a thickness of the first color resist, a thickness of the second color resist, and a thickness of the color resist layer in the first color resist area are the same.

The present disclosure further provides a manufacturing method of a including:

Step S10: providing a first substrate, coating a layer of black photoresist material on the first substrate, forming a first black matrix using a first mask process.

Step S20: coating a color resist layer on the first substrate, forming a first color resist area and a second color resist area on the color resist layer using a second mask process.

The first color resist area corresponds to a display area of the liquid crystal display panel, the second color resist area corresponds to a non-display area of the liquid crystal display panel, and the second color resist area includes a first color resist Step S30: coating a layer of second color resist material on the color resist layer, forming a second color resist using a third mask process.

The second color resist is disposed on the first color resist. A thickness of the first color resist is equal to a thickness of the second color resist.

Step S40: providing a second substrate, bonding the second substrate and the first substrate and dropping a liquid crystal material between the second substrate and the first substrate.

In the manufacturing method of the present disclosure, step S20 includes step S201: coating the color resist layer on the first substrate; step S202: performing the second mask process to the color resist layer using a multi-segment transmittance mask, and forming the first color resist area and the second color resist area on the color resist layer.

In the manufacturing method of the present disclosure, the second mask process is a halftone mask process or a grayscale mask process.

The multi-segment transmittance mask includes a first transmittance area, a second transmittance area, and a third transmittance area.

The third transmittance area corresponds to the first color resist area, the second transmittance area corresponds to the second color resist area, and the first transmittance area corresponds to an area other than the first color resist area and the second color resist area.

In the manufacturing method of the present disclosure, the first color resist is one of a red color resist block, a green color resist block, and a blue color resist block.

The second color resist is another one of the red color resist block, the green color resist block, and blue color resist block, and, and the second color resist is different from the first color resist.

In the manufacturing method of the present disclosure, thicknesses of the first color resist and the second color resist are less than a thickness of the color resist layer of the first color resist area.

In the manufacturing method of the present disclosure, a thickness of the first color resist, a thickness of the second color, and a thickness of the color resist layer of the first color resist area are the same.

In the manufacturing method of the present disclosure, a mask opening corresponding to the first color resist is greater than a mask opening corresponding to a color resist block of the liquid crystal display panel.

The present disclosure further provides a manufacturing method of a liquid crystal display panel includes step S10: providing a first substrate, coating a layer of black photoresist material on the first substrate, forming a first black matrix using a first mask manufacture process; step S20: coating a color resist layer on the first substrate, forming a first color resist area and a second color resist area on the color resist layer using a second mask process.

The first color resist area corresponds to a display area of the liquid crystal display panel, the second color resist area corresponds to a non-display area of the liquid crystal display panel, the second color resist area includes a first color resist.

Step S30: coating materials of a second color resist on the color resist layer, forming the second color resist through a third mask manufacture procedure.

The second color resist is disposed on the first color resist.

Step S40: providing a second substrate, bonding the second substrate and the first substrate, and dropping a liquid crystal material between the second substrate and the first substrate.

In the manufacturing method of the present disclosure, the step S20 includes step S201: coating the color resist layer on the first substrate; step S202: performing second mask process to the color resist layer by utilizing a multi-segment transmittance mask, and forming the first color resist area and the second color resist area on the color resist layer.

In the manufacturing method of the present disclosure, the second mask manufacture process is a halftone mask process or a grayscale mask process.

The multi-segment transmittance mask includes a first transmittance area, a second transmittance area, and a third transmittance area.

The third transmittance area corresponds to the first color resist area, the second transmittance area corresponds to the second color resist area, and the first transmittance area corresponds to an area other than the first color resist area and the second color resist area.

In the manufacturing method of the present disclosure, the first color resist is one of a red color resist block, a green color resist block, or a blue color resist block.

The second color resist is another one of the red color resist block, the green color resist block, and blue color resist block, and the second color resist is different from the first color resist.

In the manufacturing method of the present disclosure, thicknesses of the first color resist and the second color resist are less than a thickness of the color resist layer of the first color resist area.

In the manufacturing method of the present disclosure, a thickness of the first color resist, a thickness of the second color, and a thickness of the color resist layer of the first color resist area are equal.

In the manufacturing method of the present disclosure, a mask opening corresponding to the first color resist is larger than a mask opening corresponding to color resist blocks of the liquid crystal display panel.

The advantages of the present disclosure is eliminating light leakage happens on concaves of the peripheral black matrix by decreasing the thickness of the first color resist corresponding to non-displaying area of the display panel. In the meanwhile, disposing a second color resist has the same thickness as the first color resist but has different color from the first color resist. Therefore, the liquid crystal display panel can display normally.

DESCRIPTION OF DRAWINGS

In order to clearly illustrate the embodiments or the technical solutions of the embodiments or the present technologies, the drawings to be used in the embodiments or the present technologies will be briefly described below. Obviously, the drawings in the following description are merely some of the embodiments. Other drawings may be obtained by a skilled person in the art according the drawings without creative effort.

DETAILED DESCRIPTION OF PREFERRED EMBODIMENTS

The following description of the various embodiments accompany with figures is provided to illustrate the specific embodiments of the invention. Directional terms mentioned in the present invention, such as upper, lower, front, back, left, right, inside, outside, lateral, etc., are merely references to the direction of the figures. Therefore, the directional terms is used for the purpose of illustration and understanding of the present disclosure. In the figures, elements having similar structure are denoted by the same reference numbers.

The liquid crystal display panel of the present disclosure includes a displaying area and a non-displaying area. The non-displaying area surrounds the displaying area.

In one of the embodiments, the liquid crystal display panel includes an array substrate, a color filter substrate and a crystal layer disposed between the array substrate and the color filter substrate.

Figure 2:
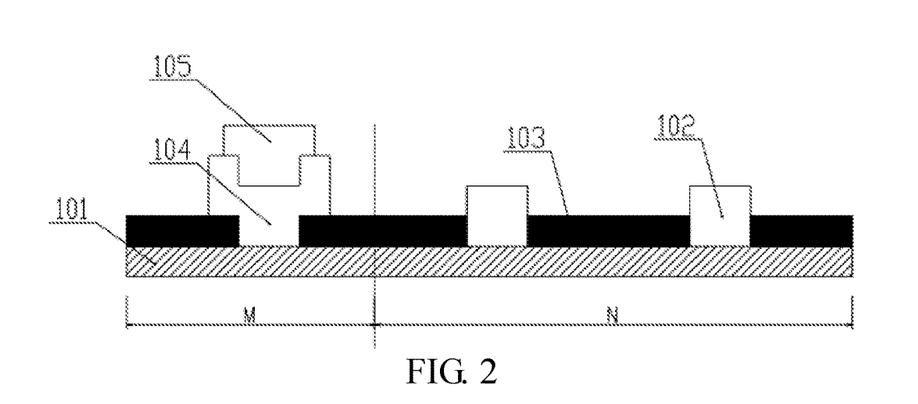
FIG. 2 illustrates a film layer structure of a color filter substrate of a first embodiment of the present disclosure.

Please refer to FIG. 2 which illustrates a film layer structure of the color filter of the embodiment of the present disclosure.

The color filter substrate is disposed opposite to the array substrate.

The color filter substrate includes a first substrate 101, a color resist layer 102, and a first black matrix (BM) 103.

In one of the embodiments, a material of the first substrate 101 and a material of a glass substrate of the array substrate is the same.

The color resist layer 102 is disposed on a surface of the first substrate 101.

The color resist layer 102 includes a first color resist area N and a second color resist area M.

The first color resist area N corresponds to a displaying area of a display panel.

In one of the embodiments, the first color resist area N includes at least one of a red color resist block, green color resist block, and a blue color resist block.

The second color resist area M corresponds to a non-displaying area of the display panel.

In one of the embodiments, second color resist area M includes one of the red color resist block, the green color resist block, and the blue color resist block.

The first black matrix 103 is utilized to divide adjacent pixel and block gaps between different colors in order to prevent light leaking or color mixture.

In one of the embodiments, the color filter substrate includes the first black matrix 103.

The first black matrix 103 forms on the first substrate 101 to divide each color resist blocks of the color resist layer 102.

The second color resist area M includes a first color resist 104 and a second color resist 105.

The second color resist 105 forms on the first color resist 104.

In one of the embodiments, the second color resist 105 is one of the red color resist block, the green color resist block, and the blue color resist block which differ from the first color resist 104.

Please refer to FIG. 2 which describes the embodiments further. In the present disclosure, the first color resist 104 is red color resist block and the second color resist 105 is blue color resist block.

An incident light becomes a red light after passing through the red color resist block. After the red light passes through the blue color resist block as another incident light, no light will emit from the blue color resist block. Therefore, leakage of red light happens on the non-displaying area of the display panel is solve. To achieve this technical effect, a thickness of the first color resist 104 and a thickness of the second color resist 105 have to be similar or the same.

In one of the embodiments, the thickness of the first color resist 104 and the thickness of the second color resist 105 is the same.

In one of the embodiments, a thickness of a color resist block in the first color resist area N, the thickness of the first color resist 104, and the thickness of the second color resist 105 is the same. The thickness of the first color resist 104 and the thickness of the second color resist 105 can be adjusted according application in practice.

In one of the embodiments, the thickness of the first color resist 104 can be less or larger than the thickness of the color resist block in the first color resist area N.

The film layer structure as shown in FIG. 2 is formed because a mask opening corresponding to the first color resist 104 is larger than a mask opening corresponding to the color resist block in the displaying area.

Figure 3:
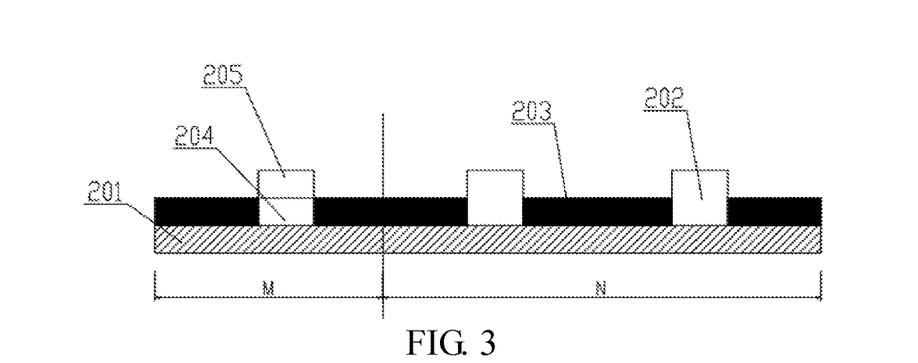
FIG. 3 illustrates a film layer structure of a color filter substrate of a second embodiment of the present disclosure.

Please refer to FIG. 3 which illustrates a film layer structure of a color filter substrate of a second embodiment of the present disclosure.

A thickness a first color resist 204 and a thickness of a second color resist 205 is the same.

In ta displaying area of the present disclosure, a thickness of a color resist block in the first color resist area N is larger than the thickness of the first color resist 204 and the thickness of the second color resist 205. The sum of the thickness of the first color resist 204 and the thickness of the second color resist 205 can be the same as, less than, or larger than the thickness of the color resist block in the displaying area according to practical application.

The present disclosure eliminates light leakage happens on concaves of the peripheral black matrix by decreasing the thickness of the first color resist in non-displaying area of the display panel. In the meanwhile, disposing a second color resist has the same thickness as the first color resist but has different color from the first color resist. Therefore, the liquid crystal display panel can display normally.

Figure 4:
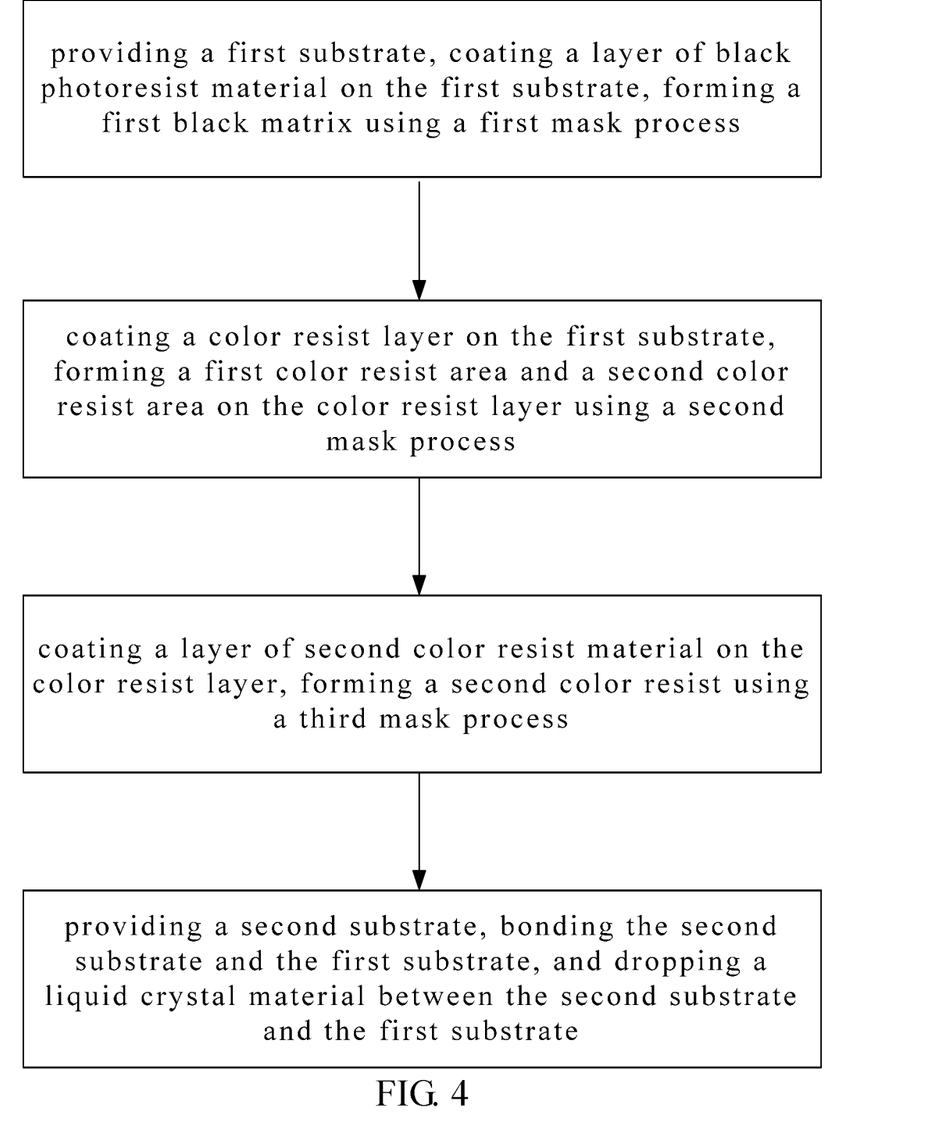
FIG. 4 illustrates a step of a manufacturing method of a liquid crystal display pane of a third embodiment of the present disclosure.

Please refer to FIG. 4 which illustrates steps of a manufacturing method of the embodiments of the liquid crystal display panel of the present disclosure.

Please refer to FIGS. 5A-5D which illustrate a third embodiments of a manufacturing method of the liquid crystal display panel of the present disclosure.

The steps of manufacturing method of the display panel are as following.

Figure 5A:
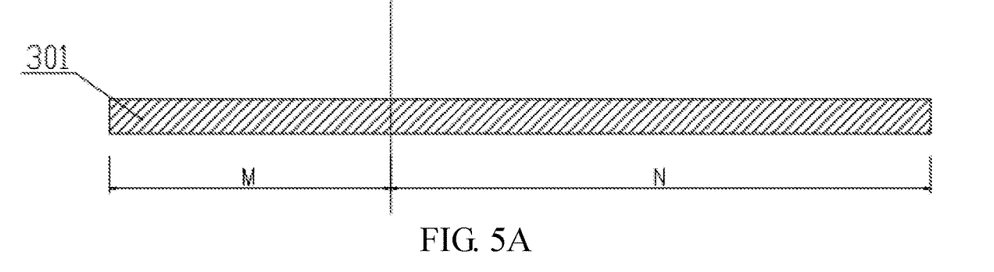
FIGS. 5A-5D illustrate steps of a manufacturing method of the liquid crystal display pane of the third embodiment of the present disclosure.
Figure 5B:
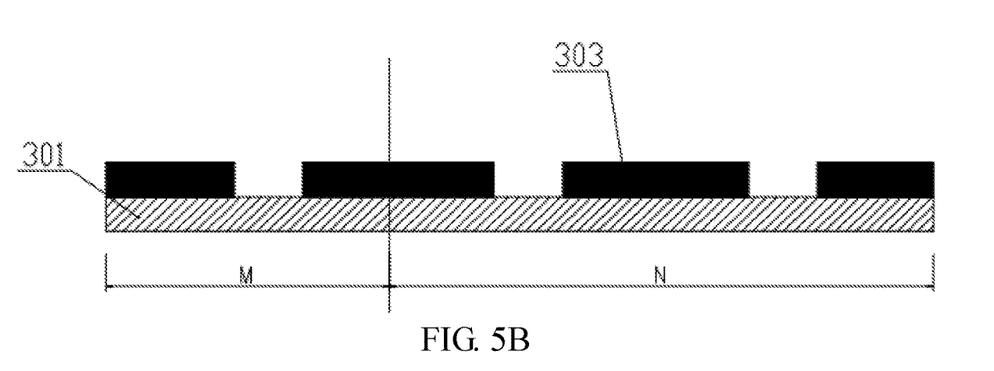

Step S10: providing a first substrate 301, coating a layer of black photoresist material on the first substrate 301, forming a first black matrix 303 using a first mask process.

Please refer to FIG. 5A and FIG. 5B, a black photoresist material is coated on the first substrate 301, and the black photoresist material is patterned by the first mask process to form the first black matrix 303.

In one of the embodiments, the black photoresist material may be a negative photoresist or a positive photoresist.

Figure 5C:
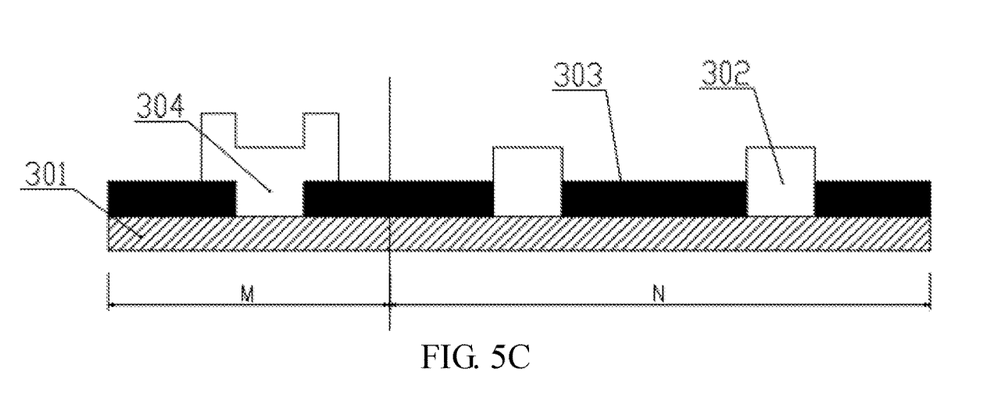

Step S20: coating a color resist layer 302 on the first substrate 301, and forming a first color resist area and a second color resist area on the color resist layer 302 by using a second mask process.

Please refer to FIG. 5C, coating a color resist layer on the first substrate, performing a second mask process on the color resist layer by using a multi-segment transmittance mask, and patterning to form a first color resist area and a second color resist area.

The first color resist area N corresponds to the displaying area of the display panel.

In one of the embodiments, the first color resist area N includes at least one of a red color resist block, a green color resist block, and a blue color resist block.

The second color resist area M corresponds to the non-displaying area of the display panel.

In one of the embodiments, second color resist area M includes one of the red color resist block, the green color resist block, and the blue color resist bloc.

The multi-segment transmittance mask includes a first transmittance area, a second transmittance area, and a third transmittance area.

The first transmittance area corresponds to color resist in the first color resist area N. The second transmittance area corresponds to the first color resist 304 of the second color resist area M. The third transmittance area corresponds to an area other than the first color resist area N and the second color resist area M.

In one of the embodiments, a transmittance of the first transmittance area and a transmittance of the second transmittance area are 100%. A transmittance of third transmittance area is 0. A transmittance of the second transmittance area of the mask can be adjusted according to practical application in order to adjust the thickness of the first color resist 304.

In one of the embodiments, a mask opening of the first color resist 304 is larger than a mask opening of a color resist of the displaying area to from the first color resist 304 having concaves as shown in figures.

Figure 5D:
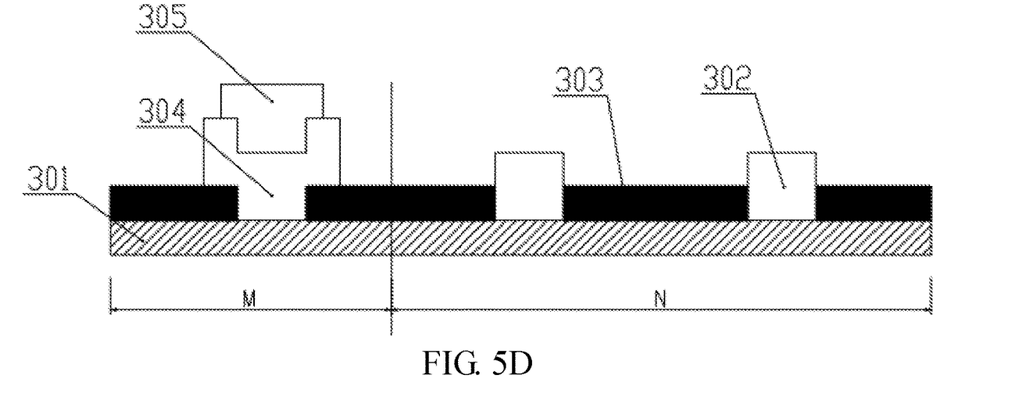
Figure 6A:
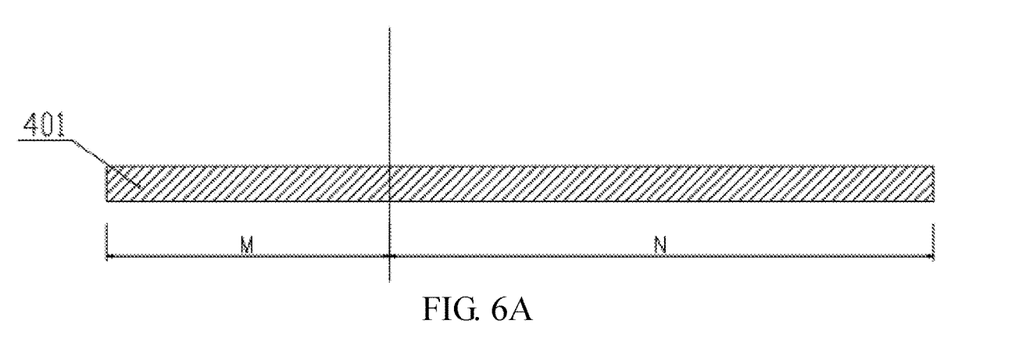
FIGS. 6A-6D illustrate steps of a manufacturing method of a liquid crystal display pane of a fourth embodiment of the present disclosure.
Figure 6B:
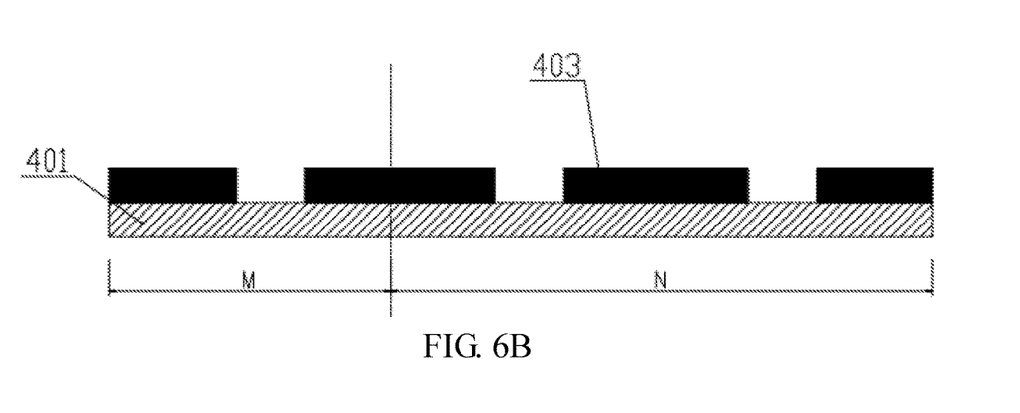
Figure 6C:
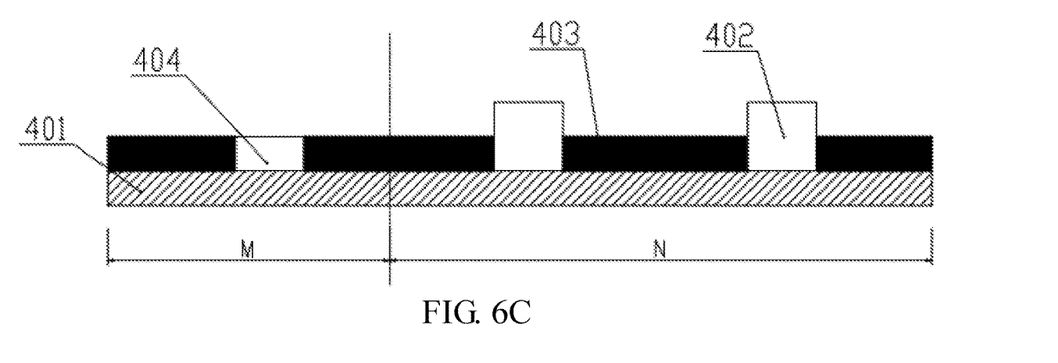
Figure 6D:
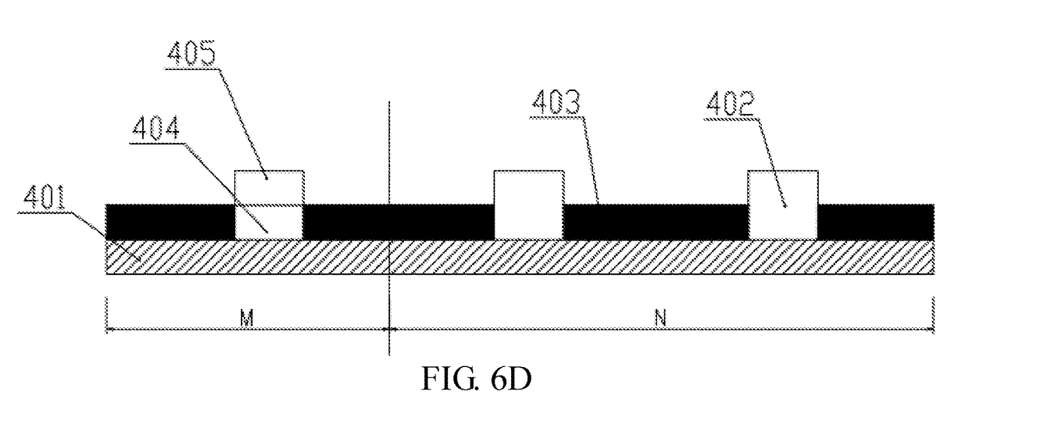

Step S30: coating a layer of second color resist material on the color resist layer and forming a second color resist using a third mask process.

Please refer to FIG. 5D. First, a second color resist material is coated on the color resist layer 302, and the color resist layer is exposed through a third mask process. After development, only the second color resist in grooves on the first color resist 304 is retained. A second color resist 305 is formed.

In one of the embodiments, the first color resist 304 is one of the red color resist block, the green color resist block, and the blue color resist block.

In one of the embodiments, the second color resist 305 is another one of the red color resist block, the green color resist block, and the blue color resist block. The second color resist 305 differs from the first color resist 304.

Step S40: providing a second substrate, bonding the second substrate and the first substrate 301, and dropping a liquid crystal material between the second substrate and the first substrate 301.

In the liquid crystal display pane of the present disclosure, an incident light becomes a red light after passing through the red color resist block. After the red light passes through the blue color resist block as another incident light, no light will emit from the blue color resist block. Therefore, leakage of red light happens on the non-displaying area of the display panel is solve. To achieve this technical effect, a thickness of the first color resist 104 and a thickness of the second color resist 105 have to be similar or the same.

Please refer to FIG. 5D, the thickness of the first color resist 104 and the thickness of the second color resist 105 is the same.

In one of the embodiments, a thickness of a color resist block in the first color resist area N, the thickness of the first color resist 104, and the thickness of the second color resist 105 is the same. The thickness of the first color resist 104 and the thickness of the second color resist 105 can be adjusted according application in practice.

In one of the embodiments, the thickness of the first color resist 104 can be less or larger than the thickness of the color resist block in the first color resist area N.

Please refer to FIGS. 6A-6D which illustrate a manufacturing method of a fourth embodiment of the liquid crystal display panel of the present disclosure.

In this embodiment, a halftone mask or a gray scale mask can be adopted in the second mask process, and the corresponding mask is reselected according to conditions. That is, a transmittance of the second transmittance area of the mask corresponding to the first color resist 404 is between a transmittance of the first transmittance area and a transmittance of the third transmittance area.

In one of the embodiments, the transmittance second transmittance area is 50%.

In one of the embodiments, the thickness of the first color resist 404 and the thickness of the second color resist 405 is the same. In the displaying area, the thickness of the color resist in the first color resist area N is larger the thickness of the color resist block of the first color resist 404 and second color resist 405. The sum of the thickness of the first color resist 404 and the thickness of the second color resist 405 can be the same as, less than or larger than the thickness of the color resist block in the displaying area. The substantial thickness can be adjusted according to practical application.

In addition, the color resist layer can be formed prior to or the formation of the black matrix. The formation of the black matrix can be prior to the formation of the color resist layer.

The present disclosure provides a liquid crystal display panel and a manufacturing method of the liquid crystal display panel. The display panel includes a displaying area and a non-displaying area. The non-displaying area surrounds the displaying area. The display panel includes an array substrate, a liquid crystal layer, and a color filter substrate. The color resist layer includes a first color resist area N and a second color resist area M. The first color resist area N corresponds to the displaying area. The second color resist area M corresponds to the non-displaying area. The second color resist area M includes a first color resist and a second color resist. The second color resist forms on the first color resist. By overlapping resist blocks in two different colors, light leakage happens on concaves of the peripheral black matrix is eliminated. Therefore, the liquid crystal display panel can display normally.

Although the present disclosure has been disclosed in the above preferred embodiments, but the preferred embodiments are not intended to limit the present disclosure. Modifications and amendment which can be obtained by a skill person in the art without departing from the concept and scope of the present disclosure fall into the protected scope defined by the claims.

What is claimed is:

1. A liquid crystal display panel, comprising:
   a display area;
   a non-display area surrounding the display area;
   an array substrate; and
   a color filter substrate disposed opposite to the array substrate;
   wherein the color filter substrate comprises:
      a first substrate;
      a first black matrix disposed on the first substrate; and
      a color resist layer disposed on the first substrate;
   wherein the color resist layer comprises:
      a first color resist area corresponding to the display area; and
      a second color resist area corresponding to the non-display area;
   wherein the second color resist area comprises a first color resist and a second color resist, wherein the second color resist is disposed on the first color resist, and the first color resist and second color resist are disposed between two adjacent first black matrixes;
   wherein a thickness of the first color resist is equal to a thickness of the second color resist;
   wherein the first color resist is a Y-shaped first color resist;
   wherein the first color resist and the second color resist have different colors;
   wherein the first color resist is one of a red color resist block, a green color resist block, and a blue color resist block; and
   the second color resist is another one of the red color resist block, the green color resist block, and the blue color resist block, and the second color resist is different from the first color resist.

2. The liquid crystal display panel according to claim 1, wherein thicknesses of the first color resist and the second color resist are less than a thickness of the color resist layer in the first color resist area.

3. A manufacturing method of a liquid crystal display panel, comprising:
   step S10: providing a first substrate, coating a layer of black photoresist material on the first substrate, forming a first black matrix using a first mask process;
   step S20: coating a color resist layer on the first substrate, forming a first color resist area and a second color resist area on the color resist layer using a second mask process;
   wherein the first color resist area corresponds to a display area of the liquid crystal display panel, the second color resist area corresponds to a non-display area of the liquid crystal display panel; and the second color resist area comprises a first color resist;
   step S30: coating a layer of second color resist material on the color resist layer, forming a second color resist using a third mask process;
   wherein the second color resist is disposed on the first color resist, a thickness of the first color resist is equal to a thickness of the second color resist;
   wherein the first color resist is a Y-shaped first color resist;
   wherein the first color resist and the second color resist have different colors;

wherein the first color resist is one of a red color resist block, a green color resist block, and a blue color resist block; and wherein the second color resist is another one of the red color resist block, the green color resist block, and blue color resist block, and the second color resist is different from the first color resist; and step S40: providing a second substrate, bonding the second substrate and the first substrate, and dropping a liquid crystal material between the second substrate and the first substrate.

4. The manufacturing method according to claim 3, wherein the step 20 comprises:

step S201: coating the color resist layer on the first substrate;

step S202: performing the second mask process to the color resist layer using a multi-segment transmittance mask, and forming the first color resist area and the second color resist area on the color resist layer.

5. The manufacturing method according to claim 4, wherein the second mask process is a halftone mask process or a grayscale mask process;

the multi-segment transmittance mask comprises a first transmittance area, a second transmittance area, and a third transmittance area, the third transmittance area corresponds to the first color resist area, the second transmittance area corresponds to the second color resist area, and the first transmittance area corresponds to an area other than the first color resist area and the second color resist area.

6. The manufacturing method according to claim 3, wherein thicknesses of the first color resist and the second color resist are less than a thickness of the color resist layer of the first color resist area.

7. The manufacturing method according to claim 3, wherein a mask opening corresponding to the first color resist is greater than a mask opening corresponding to a color resist block of the liquid crystal display panel.

8. A manufacturing method of a liquid crystal display panel, comprising:

step S10: providing a first substrate, coating a layer of black photoresist material on the first substrate, forming a first black matrix using a first mask manufacture process;

step S20: coating a color resist layer on the first substrate, forming a first color resist area and a second color resist area on the color resist layer using a second mask process;

wherein the first color resist area corresponds to a display area of the liquid crystal display panel, the second color resist area corresponds to a non-display area of the liquid crystal display panel, and the second color resist area comprises a first color resist;

step S30: coating materials of a second color resist on the color resist layer, forming the second color resist through a third mask manufacture procedure;

wherein the second color resist is disposed on the first color resist;

wherein a thickness of the first color resist is equal to a thickness of the second color resist;

wherein the first color resist is a Y-shaped first color resist;

wherein the first color resist and the second color resist have different colors;

wherein the first color resist is one of a red color resist block, a green color resist block, or a blue color resist block; and wherein the second color resist is another one of the red color resist block, the green color resist block, and blue color resist block, and the second color resist is different from the first color resist; and step S40: providing a second substrate, bonding the second substrate and the first substrate, and dropping a liquid crystal material between the second substrate and the first substrate.

9. The manufacturing method according to claim 8, wherein the step 20 comprises:

step S201: coating the color resist layer on the first substrate;

step S202: performing second mask process to the color resist layer by utilizing a multi-segment transmittance mask, and forming the first color resist area and the second color resist area on the color resist layer.

10. The manufacturing method according to claim 9 wherein the second mask manufacture process is a halftone mask process or a grayscale mask process;

the multi-segment transmittance mask comprises a first transmittance area, a second transmittance area, and a third transmittance area, the third transmittance area corresponds to the first color resist area, the second transmittance area corresponds to the second color resist area, and the first transmittance area corresponds to an area other than the first color resist area and the second color resist area.

11. The manufacturing method according to claim 8, wherein thicknesses of the first color resist and the second color resist are less than a thickness of the color resist layer of the first color resist area.

12. The manufacturing method according to claim 8, wherein a mask opening corresponding to the first color resist is larger than a mask opening corresponding to color resist blocks of the liquid crystal display panel.

* * * * *